I. H. DAVIS.
MOTOR MOWER.
APPLICATION FILED JULY 15, 1913.
1,116,390.
Patented Nov. 10, 1914.
3 SHEETS—SHEET 1.
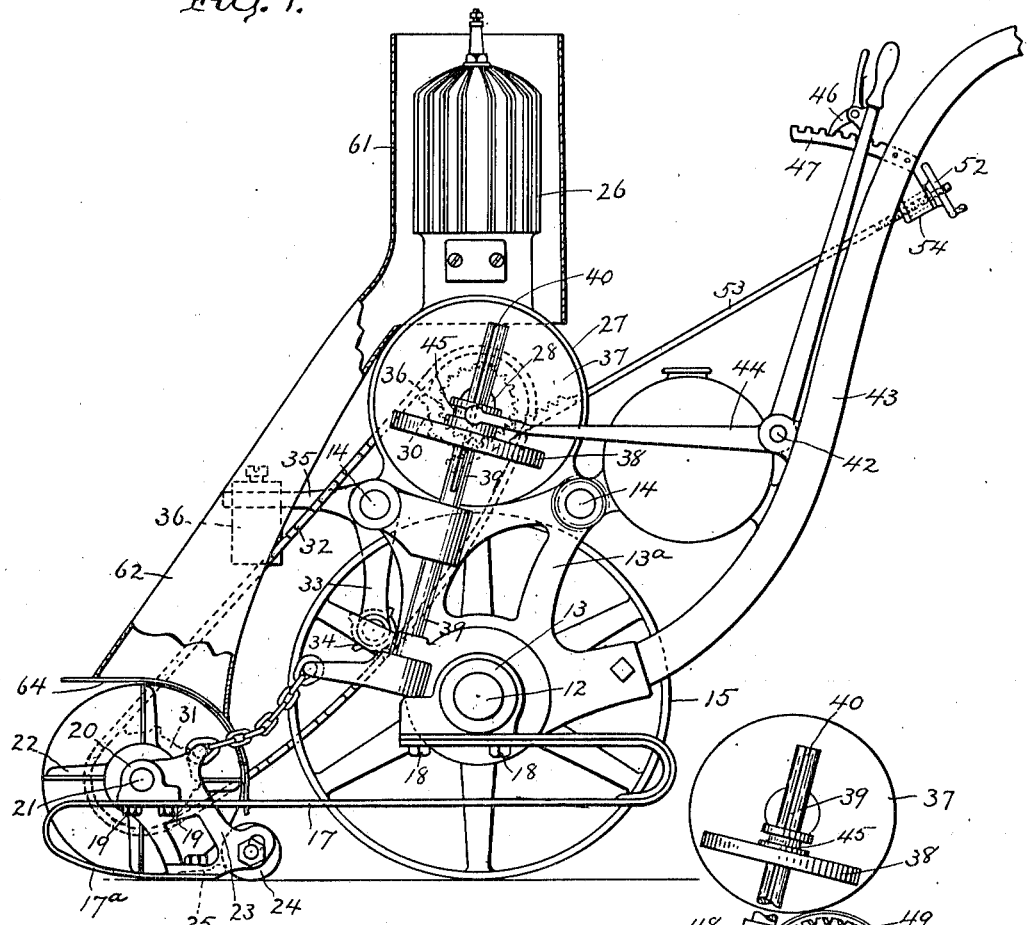
Fig. 1.
Fig. 2.
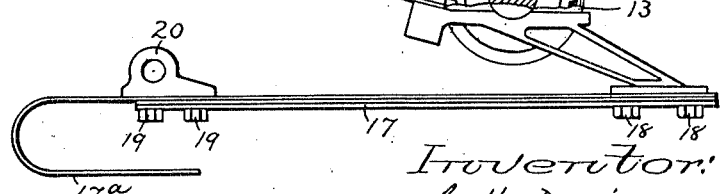
Witnesses:
P. W. Pezzetti
D. L. Clark.
Inventor:
I. H. Davis
by Wight Brown Quimby May
Attys.

I. H. DAVIS.
MOTOR MOWER.
APPLICATION FILED JULY 15, 1913.

1,116,390.

Patented Nov. 10, 1914.
3 SHEETS—SHEET 2.

Witnesses:
D. L. Clark

Inventor:
I. H. Davis
by Wright Brown Quinby May
Attys.

I. H. DAVIS.
MOTOR MOWER.
APPLICATION FILED JULY 15, 1913.
1,116,390.
Patented Nov. 10, 1914.
3 SHEETS—SHEET 3.
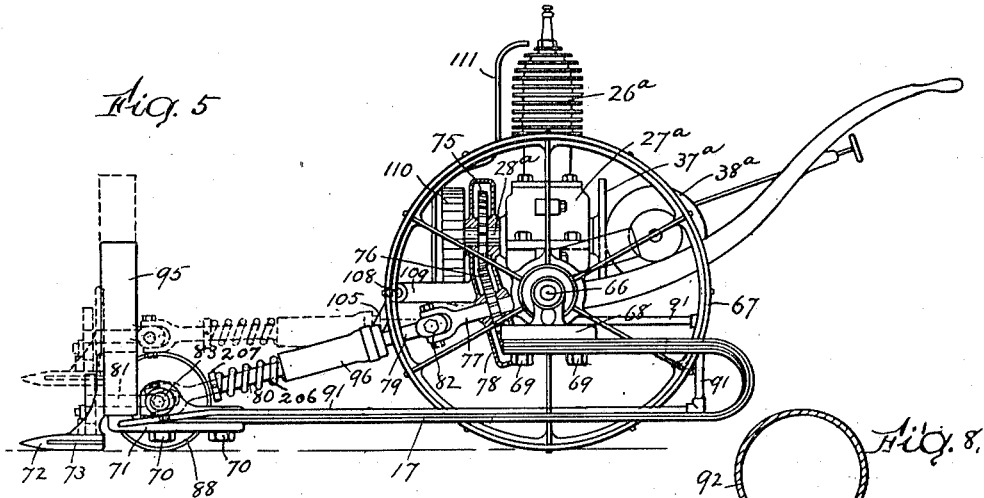
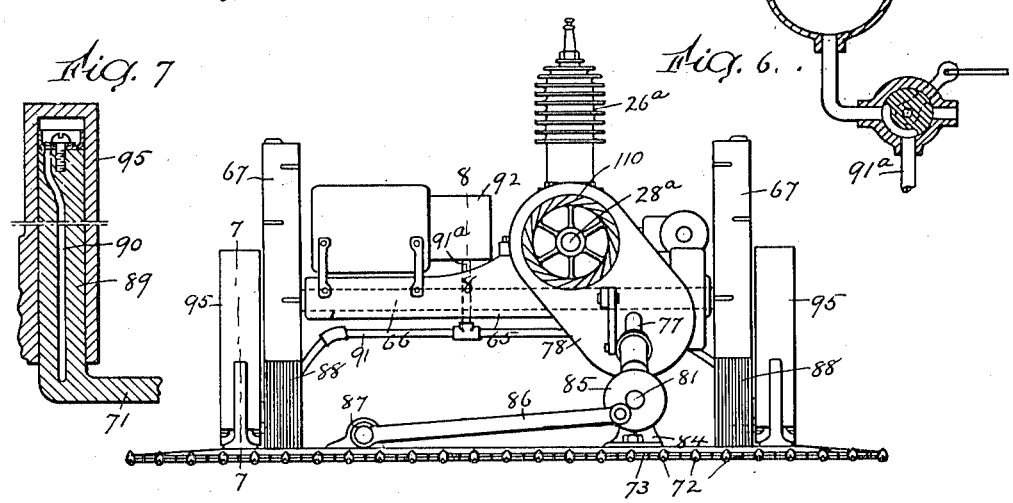
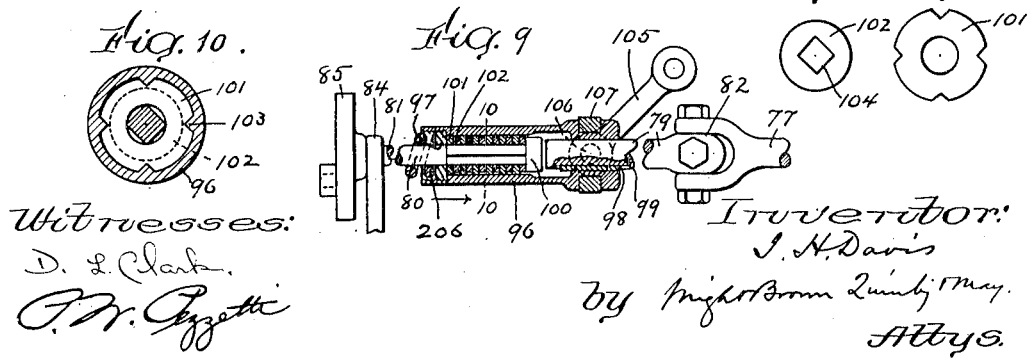
Witnesses:
D. L. Clark
P. M. Cozzetti
Inventor:
I. H. Davis
by Wright Brown Quinby & May
Attys.

UNITED STATES PATENT OFFICE.

ISAAC H. DAVIS, OF BOSTON, MASSACHUSETTS, ASSIGNOR OF TWO-THIRDS TO H. H. WESTINGHOUSE, OF NEW YORK, N. Y.

MOTOR-MOWER.

1,116,390.        Specification of Letters Patent.        Patented Nov. 10, 1914.

Application filed July 15, 1913. Serial No. 779,158.

*To all whom it may concern:*

Be it known that I, ISAAC H. DAVIS, a citizen of the United States, of Boston, in the county of Suffolk and State of Massachusetts, have invented certain new and useful Improvements in Motor - Mowers, of which the following is a specification.

This invention relates to motor driven grass cutting machines, certain features of the invention being applicable to machines of the rotary cutter or lawn mower type, and to machines of the reciprocating cutter type adapted either for lawn mowing or hay making purposes.

The invention has for its object, first, to simplify the construction of the frame of the machine and provide a single frame partially of rigid and partially of flexible or resilient construction, the rigid portion carrying the motor and being carried by the traction rollers or wheels driven by the motor, while the flexible portion of the frame carries the cutting mechanism and is supported with said mechanism independently by the ground so that the cutting mechanism is free to adapt itself to the surface of the ground independently of the wheel or roller-supported portion of the frame.

The invention has for its object, secondly, to provide an improved frictional mechanism for transmitting motion from the motor to the driving axle, said mechanism providing for any desired variation of speed of the driving axle, and for a reversal of the direction of its rotation.

The invention also has for its object to provide pneumatic means for quickly raising and depressing the cutting mechanism when the latter is of the reciprocating cutter bar type, to enable the cutting mechanism to pass over an obstruction, and adapt the machine to travel without cutting.

The invention also has for its object to provide means for automatically making the cutter bar inoperative when the cutting mechanism is raised.

To these and other related ends, the invention consists in the improvements which I will now proceed to describe and claim.

Figure 3:
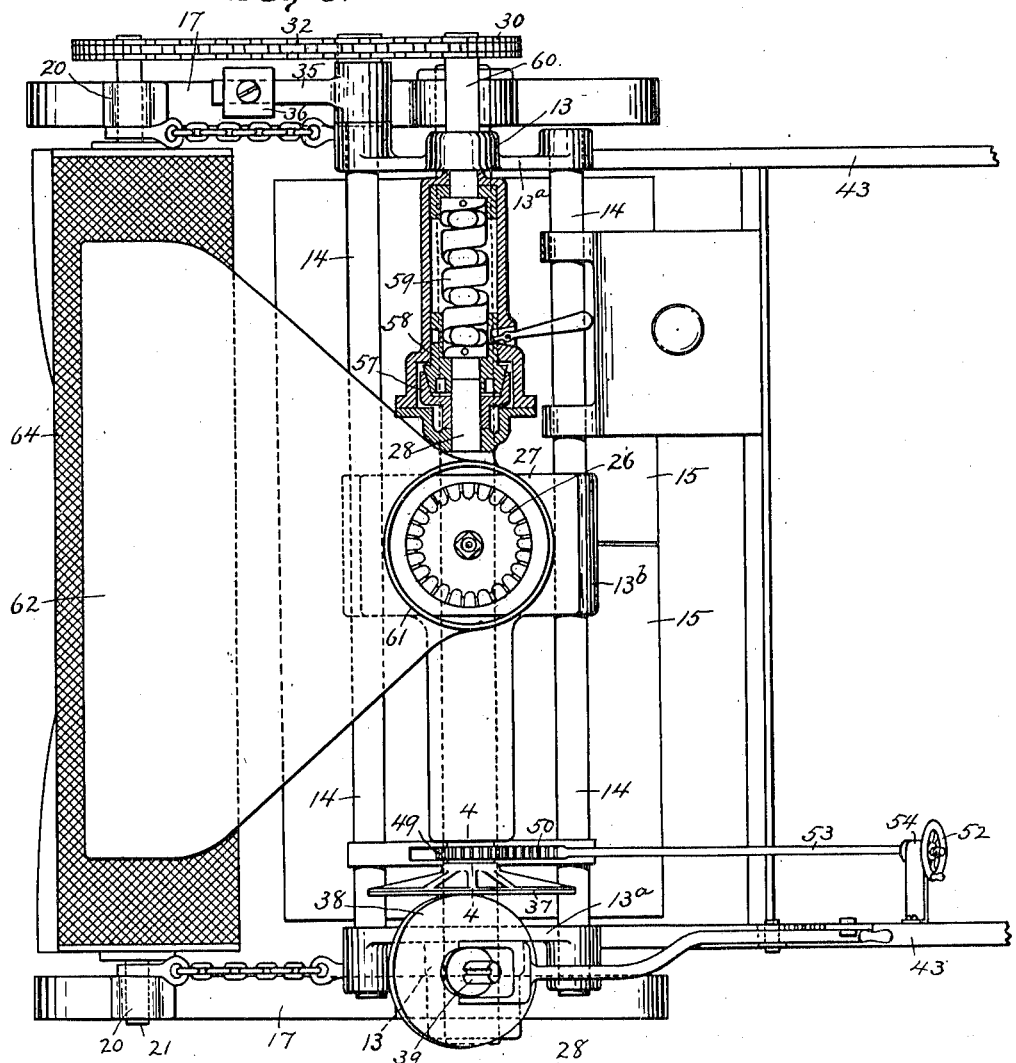
Figure 4:
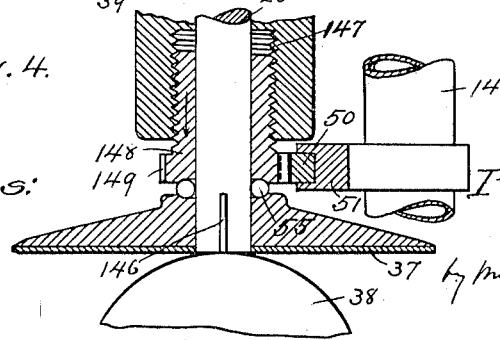

Of the accompanying drawings:—Figure 1 represents a side elevation of a mower of the rotary cutter or lawn mower type embodying my invention. Fig. 2 represents a fragmentary view showing the details of the reducing gearing connecting the motor with the driving axle, and a modification of the form of one of the resilient frame extensions hereinafter referred to. Fig. 3 represents a plan view of the machine shown by Fig. 1, parts being shown in section. Fig. 4 represents a section on line 4—4 of Fig. 3. Fig. 5 represents a side elevation of a mowing machine of the reciprocating cutter bar type embodying my invention, parts being shown in section. Fig. 6 represents a front elevation of the machine shown by Fig. 5. Fig. 7 represents a section on line 7—7 of Fig. 6. Fig. 8 represents a section on line 8—8 of Fig. 6. Fig. 9 represents a fragmentary view showing portions of the flexible, cutter-bar-operating shaft shown by Figs. 5 and 6, parts being shown in section. Fig. 10 represents a section on line 10—10 of Fig. 9. Figs. 11 and 12 represent side views of the clutch plates hereinafter referred to.

The same reference characters indicate the same parts in all the figures.

Referring first to Figs. 1, 2, 3 and 4,—12 represents a driving axle journaled in bearings 13 forming parts of frame members 13ª which are connected to the tie rods 14. Said frame members and rods and a central frame member 13ᵇ attached to the central portions of the rod, constitute the wheel-supported body portion of the machine frame. The axle is provided with traction wheels 15, which are rigidly attached to the axle, and in this embodiment of the invention are elongated to form alined lawn rollers. The above described body portion of the frame, which is of rigid construction, is supplemented by forwardly projecting frame extensions or push bars 17 on which the cutting mechanism is mounted, said extensions causing the cutting mechanism to travel with the wheeled body portion and being flexible or resilient, and adapted not only to permit the cutting mechanism to rise and fall independently, but also to assume any longitudinal inclinations that may be required by the contour of the ground, either end of the cutting mechanism being adapted to be elevated above or depressed below the other. The frame extensions 17 may be of any suitable material such as a suitably tough and resilient wood, or steel, preferably the latter.

The extensions, when constructed as shown by Figs. 1 and 3, are composed of U-shaped strips of steel, one of the arms being shorter than the other and attached by bolts 18 to the end members of the frame body. The longer arms project forward from the frame body and are attached by bolts 19 to the bearings 20 in which the shaft 21 of the movable cutting member or rotary knife reel 22 is journaled. Said bearings are formed with arms 23 which support the usual small ground wheels or trucks 24, and the bed plate 25 (shown by dotted lines in Fig. 1) to which is attached the usual fixed knife (not shown) which constitutes the fixed member of the cutting mechanism and coöperates with the revolving knives of the knife reel. The portions of the frame extensions between the bolts 18 and 19 are flexible vertically and are also adapted to yield to torsional strain so that the cutting mechanism is not only free to rise and fall independently of the frame body, and its supporting wheels or rollers, but is also adapted to be longitudinally inclined or tilted endwise. The frame extensions are practically rigid against pressure tending to move them edgewise or horizontally so that they confine the cutting mechanism against horizontal endwise displacement, this confinement being due in part to the described rigid connections between the rear ends of the frame extensions and the frame body, and between the forward ends of the extensions and the fixed members of the cutting mechanism.

Each frame extension may be composed of a plurality of leaves or layers, and, as shown by Fig. 1, the shorter arm and the bend or neck connecting the two arms may be made of a greater number of leaves than the longer arm. The number of leaves may obviously be varied to give the extensions any degree of stiffness required, it being desirable to make the extensions sufficiently stiff to prevent the frame body (loaded by the motor hereinafter described) from tipping forward by its own weight.

The forward ends of the frame extensions may be bent downwardly and rearwardly to from runners 17ª which may bear lightly on the ground in advance of the small wheels 24.

It will be seen that the resilient frame extensions rigidly attached at their ends to the frame body and cutting mechanism and intermediately flexible and resilient, enable the frame body and its load to be supported by a single pair of driving wheels or rollers, and an axle common to both wheels, the frame extensions being sufficiently stiff to prevent the frame body and its load from tipping forward, and the weight of the cutting mechanism acting through said extensions to prevent the frame body and its load from tipping backward. The frame body and extensions constitute in effect a single unitary frame partially of flexible construction, said frame being relatively inexpensive, light and compact, and obviating the disadvantages resulting from the construction heretofore employed comprising two loosely connected and independently supported rigid frames, one carrying the motor and the other the cutting mechanism.

In my improved machine, the cutting mechanism and the motor are carried by one frame, and the cutting mechanism is an important factor in supporting the motor in an upright position. The flexible portions of the frame formed by the extensions 17 enables the frame to absorb shock caused by contact of the cutting mechanism with an obstruction.

The frame body is formed to support a motor with its center of gravity directly over the driving axle. I have here shown an air-cooled gasolene motor of which 26 represents the cylinder, and 27 the crank case. The motor is preferably secured to the central frame member 13$^b$, and its crank shaft 28, is parallel with the driving axle 12. The motor is connected with one end portion of the shaft 21 of the knife reel by flexible constant-speed driving connections, here shown as comprising a sprocket wheel 30 driven by the crank shaft, a sprocket wheel 31 attached to the shaft 21, and a chain 32 connecting said sprocket wheels and automatically kept taut, while the cutting mechanism rises and falls, by a two armed lever fulcrumed on one of the tie rods 14, the arm 33 of said lever having an idle sprocket wheel 34 engaging one stretch of the chain 32, while the other arm 35 has a weight 36 which presses the arm 33 toward the chain. I have provided variable speed frictional driving connections between the opposite end portion of the crank shaft and the driving axle, having the important advantages hereinafter described, said connections being organized as follows:—37 represents a friction member, preferably a disk engaged with and rotated by the crank shaft 28, and having a flat frictional face which stands at right angles with the axis of the crank shaft. 38 represents a disk which is keyed and movable on a driven shaft 39, the axis of which is at right angles with the axis of the crank shaft. The shaft 39 has a key-way 40 in which a key in the hub of the disk 38 is adapted to slide. The periphery of the disk 38 is in rolling contact with the face of the member 37, so that the disk is frictionally driven. The shaft 39 extends across the outer end of the crank shaft so that the disk 38 is adapted to bear on the member 37 at either of two diametrically opposite sides of the axis of the crank shaft, and therefore to receive either a forward or a backward rotation from said member.

The disk 38 is adjustable by means of a bell crank lever 44 fulcrumed at 42 to one of the guiding bars 43, one arm of said lever having a fork engaging a groove 45 in the hub of the disk 38. The other arm has a locking dog 46 adapted to engage a notched segmental locking arm 47. The lever 44 is adapted to adjust the disk 38 and hold it at either side of the axis of the crank shaft, and at various distances from said axis so that the disk and the shaft 39 may be driven at various speeds and in either direction.

The shaft 39 is connected with the driving axle 12 by speed-reducing gearing, preferably composed of a worm 48 on the shaft, and a worm wheel 49 on the axle as shown by Fig. 2.

The frictional driving member 37 is preferably adjustable on the crank shaft 28, toward and from the periphery of the disk 38 to vary its pressure against the disk and compensate for wear of the contacting surfaces of the member and disk. To this end, the member 37 is slidable on the shaft 28 and is engaged with a key or feather 146, Fig. 4, on said shaft.

One of the shaft bearings on the crank case 27 is provided with an internally threaded socket 147 into which is screwed an externally screw-threaded bushing 148, having at its outer end a pinion 149. A rack 50 slidable in a fixed guide 51 meshes with said pinion and is movable endwise by a hand wheel nut 52 engaging the threaded end of a rod 53 attached to the rack, said nut being rotatable in a fixed socket 54. When the bushing 148 is rotated, it is also moved endwise, and when moved in the direction of the arrow, Fig. 4, it increases the pressure of the member 37 against the disk 38. Antifriction balls 55 are preferably interposed between the bushing 148 and the member 37.

Among the advantages of the above-described frictional transmitting mechanism are simplicity and cheapness of construction and efficiency, the member 37 and disk 38 acting as both clutch and reversing members, giving any desired graduations of speed and power, and enabling the machine to climb steeper grades than would be possible with ordinary forms of gear transmission. Said frictional mechanism permits such a wide range of speed control that a motor of lower power and smaller size than would be suitable without the frictional mechanism may be employed, the motor being adapted to propel the traction wheels at a sufficiently slow speed to obtain the power required to overcome the resistance of steep grades and heavy grass. A saving in the cost of manufacture and operation is therefore effected. The mower may therefore be caused to crawl or move very slowly when an unusually steep grade or unusually heavy grass is encountered, a small motor developing all the power required under such conditions.

The crank shaft 28 is preferably connected with the sprocket wheel 30 through the medium of friction clutch members 57, 58, a helical spring or shaft section 59, and an outer shaft section 60, said connections permitting the stoppage of the movable member of the cutting mechanism when it meets an obstruction. Similar connections are shown in Letters Patent of the United States No. 750,616, granted to me January 26, 1904.

61 represents an open ended casing or flue surrounding the motor cylinder 26, and communicating with a flaring air guide 62, the enlarged lower end of which is located over the knife reel 22 and is adapted to receive air set in motion by the revolving knives. The air is conducted by the guide 62 to the flue 61 and passes through the latter to cool the cylinder. A screen 64 at the lower end of the air guide 62 prevents cut grass from entering the air guide.

Figs. 5 to 10, inclusive, represent my invention embodied in a machine of the reciprocating cutter-bar type, adapted to cut tall grass. The rigid body portion of the machine frame is represented in Fig. 6, somewhat conventionally, at 65, said body portion providing a bearing for the driving axle 66 which is provided at opposite ends of the frame body with traction wheels 67. The frame body also includes downwardly projecting brackets 68, to which the shorter arms of the U-shaped frame extensions 17 are rigidly secured by bolts 69. The forward ends of the extensions 17 are rigidly connected by bolts 70 with ears or fittings 71 which are connected as hereinafter described, with the usual finger bar having the guard fingers 72 with which the usual reciprocating cutter bar 73 coöperates in cutting standing grass.

26$^a$ represents the cylinder, and 27$^a$ the crank case of the motor, which is suitably attached to the body portion of the frame, the crank shaft 28$^a$ in this case extending at right angles with the driving axle 66.

The constant speed mechanism for transmitting motion from one end portion of the crank shaft to the reciprocating cutter bar 73, in this case is organized as follows: 75 represents a gear affixed to the crank shaft 28$^a$ and meshing with a gear 76 affixed to a member 77 of a flexible shaft, said member being journaled in bearings formed on a fixed gear case 78. The said flexible shaft includes additional members 79, 80 and 81, the members 77 and 79 being connected by a universal joint 82, and the members 80 and 81 being connected by a universal joint 83, these joints being of ordinary construction, so that the members, while rotatable in unison, are adapted to stand at different angles. The member 81 is journaled in a bearing 84 rigidly connected with the finger bar, and is provided with a fly-wheel 85 with which one end of a connecting-rod or pitman 86 is eccentrically engaged, the other end of said rod being engaged with an ear 87 attached to the reciprocating cutter bar. Small ground wheels or trucks 88 are suitably connected with the finger bar and support the same in suitable relation to the surface of the ground.

I have provided pneumatic means for quickly raising and depressing the cutting mechanism, to enable it to pass over obstructions on the ground while mowing, and to be held above the ground when being transported to and from the place where the machine is stored. To this end vertical guides 89 are connected with the finger bar, near opposite end portions thereof, said guides being preferably formed on the plates or fittings 71 above described. In the guides 89 are formed air ducts or channels 90, which are connected by tubes 91 with an air reservoir 92, in which air under pressure is stored by the operation of the motor, through a suitable air compressor or pump, not shown. The tubes 91 extend along the resilient portions of the frame extension 17, as indicated by Fig. 5, and are flexible, so that they partake of the movements of said extensions 17, the flexible portions meeting in a main tube 91ª, which enters the air reservoir, and may be provided with a controlling valve whereby air may be liberated from the reservoir and allowed to pass through the tubes 91 and air ducts 90. With the end portions of the finger bar are rigidly connected inverted cylinders 95, which have a close sliding fit on the guides 89. The finger bar and the cutter bar are therefore carried by the cylinders 95 and movable vertically therewith. When air is liberated from the reservoir 92, it enters the cylinders 95 and raises the same with the cutting mechanism, as indicated by dotted lines in Fig. 5, the flexible power-transmitting shaft being also raised. The air thus admitted through the cylinder 95 holds the cutting mechanism raised until it is released by a suitable valve, whereupon, the cylinders 95 and the cutting mechanism descend by gravitation, the guides 89 and cylinders 95 acting as dashpots.

I prefer to provide the flexible power-transmitting shaft above described with an automatic clutch, which is operative to impart motion to the cutter bar only when the cutting mechanism is depressed, the member 80 of said shaft being automatically disconnected from its driving engagement with the member 79, by the operation of elevating the cutting mechanism. The preferred construction of said automatic clutch is as follows:—96 represents a sleeve having at one end a friction plate abutment 97, adapted to slide on the shaft member 80, the opposite end of the sleeve being provided with a key 98, which is in sliding engagement with a key-way 99 in the shaft member 79, the sleeve being adapted to rotate with the member 79 independently of the member 80. The shaft member 80 has a friction plate abutment 100 within the sleeve 96, and separated from the abutment 97 by a space which contains two series of normally loose annular friction plates 101 and 102, the plates of one series alternating with those of the other. The plates 101 are grooved to engage longitudinal ribs 103 on the interior of the sleeve 96. The plates 102 are provided with square apertures 104 (Fig. 11) which have a sliding fit on a squared portion of the shaft member 80. 105 represents a link pivoted at 106 to a ring 107 in which the sleeve 96 is rotatable. The other end of said link is pivoted at 108 to a fixed arm 109. The depression of the cutting mechanism to the full line position shown by Fig. 5, causes the sleeve 96 to move endwise in the direction of the arrow, Fig. 9, and thus causes the abutment 97 to coöperate with the abutment 100 in pressing all the plates closely against each other and setting up a frictional engagement between the plates which rotate with the sleeve and the plates which rotate with the shaft member 80, so that the shaft member 80 is operatively connected through said plates with the sleeve which in turn is engaged with the shaft member 79 by the key 98, so that motion is transmitted from the member 79 through the sleeve and clutch plates to the member 80. When the cutting mechanism and the flexible shaft are raised, as indicated by Fig. 9 and by dotted lines in Fig. 5, the sleeve 96 is moved slightly by the links 105 in the opposite direction, so that the bearing of the plates on each other is loosened, and the shaft member 79 no longer transmits rotary motion to the shaft member 80. 206 represents a spring interposed between the abutment 97, and a collar 207 on the member 80. Said spring maintains a constant pressure of the clutch plates against each other, and although this pressure alone is not sufficient to cause a clutching engagement between the two series of plates when the cutting mechanism is raised, the added pressure due to the endwise movement of the sleeve when the cutting mechanism is lowered, is sufficient to cause said clutching engagement without exerting end thrust on the joints 82 and 83, the clutch being practically self-contained and the members 79 and 80 free from contact with each other, as shown by Fig. 9.

The crank shaft 28ª is provided at the end opposite the end having the gear 15 with a flat faced frictional driving member 37ª, in frictional engagement with a disk 38ª, said parts corresponding to the parts 37 and 38 above described, as members of the variable speed frictional connections between the crank shaft and the driving axle.

As shown by Figs. 5 and 6, the crank shaft 28ª is provided with a fan 110 arranged to force a current of air against the motor cylinder 26ª, to cool the same. A screen 111 (Fig. 5) may be interposed between the cylinder 26ª and the cutting mechanism from lodging on the cylinder.

The resilient portions of the frame extensions 17 may be straight, as shown by Fig. 2, instead of being U-shaped, the rear ends of said extensions being bolted to downwardly projecting rigid arms or ears on the frame body.

In each embodiment of the invention the connections between the crank shaft of the motor and the cutting mechanism are at one end of the crank shaft and the connections between the crank shaft and the driving axle are at the opposite end of the crank shaft. This arrangement results in a compact relatively inexpensive and simple construction, the length of the crank shaft being reduced to the minimum.

In the embodiment of the invention shown by Figs. 1, 2 and 3, the crank shaft of the motor is arranged substantially parallel with the driving axle. This parallelism between the crank shaft and the driving axle also results in compactness and simplicity of construction, the end portions of the crank shaft being located in the most advantageous positions for engagement with the cutting mechanism.

I claim:—

1. A grass-cutting machine comprising wheel supported frame body, frame extensions each rigidly connected at one end to same frame body, and cutting mechanism connected with the free end of said extensions, the intermediate portions of said frame extensions being resilient.

2. A grass cutting machine comprising cutting mechanism, a wheel-supported frame body and U-shaped frame extensions having shorter arms rigidly connected with the frame body and longer arms rigidly connected with one member of the cutting mechanism, the intermediate portions of said frame extensions being resilient.

3. The combination of a frame having forwardly extended side bars, bearings carried by said side bars at their forward ends an axle mounted in said frame, traction wheels connected with said axle, cutting mechanism including a rotatable shaft mounted in said bearings, a motor mounted in said frame directly over said axle and including a crank shaft, a drive shaft leading to and connected at one end with said axle, constant speed driving connections between the cutting mechanism and one end of said crank shaft, and variable speed connections between the other end of said crank shaft and said drive shaft.

4. The combination of a frame having forwardly extended side bars, an axle mounted in said frame, traction wheels connected with said axle, cutting mechanism mounted in the forward portions of said side bars, a motor mounted in said frame directly over said axle and including a crank shaft, a drive shaft leading to and connected at one end with said axle, constant speed driving connections between the cutting mechanism and one end of said crank shaft, a frictional driving member attached to the other end of said crank shaft and having a flat face at right angles with the axis of said shaft, a friction disk adjustably connected with said drive shaft and having its periphery in frictional engagement with the face of said driving member, and means for adjusting said disk.

5. The combination of a frame having forwardly extended side bars, an axle mounted in said frame, traction wheels connected with said axle, cutting mechanism mounted in the forward portions of said side bars, a motor mounted in said frame directly over said axle and including a crank shaft, a drive shaft leading to and connected at one end with said axle, constant speed driving connection between the cutting mechanism and one end of said crank shaft, a frictional driving member attached to the other end of said crank shaft and having a flat face at right angles with the axis of said shaft, a friction disk adjustably connected with said drive shaft and having its periphery in frictional engagement with the face of said driving member, means for adjusting said disk, and means for adjusting the driving member toward and from the periphery of the disk.

6. The combination of a wheeled frame body, resilient frame extensions projecting forward from the body, a motor mounted on the frame body, a cutting mechanism including a finger bar and a reciprocating cutter bar mounted on the frame extensions, and driving connections between the motor and the cutter bar, said connections including a flexible shaft driven by the motor, and means for imparting a reciprocating motion from the shaft to the cutter bar.

7. The combination of a wheeled frame having substantially vertical guides forward of the wheels, a motor mounted on the frame, a cutting mechanism including a finger bar and a reciprocating cutter bar mounted on the forward portion of the frame and movable vertically on said guides, flexible driving connections between the motor and the cutter bar and pneumatic means for varying the height of the cutting mechanism relatively to the frame.

8. The combination of a wheeled frame having substantially vertical guides provided with air passages, a motor mounted on the frame, an air reservoir connected with the motor, a cutting mechanism including a finger bar having cylinders movable on said guides, valved connections between the air reservoir and the air channels of the guides whereby air liberated from the reservoir is caused to raise the cutting mechanism, and flexible driving connections between the motor and the cutter bar.

9. The combination of a wheeled frame, having substantially vertical guides forward of the wheels, a motor mounted on the frame, a cutting mechanism including a finger bar and a reciprocating cutter bar mounted on the forward portion of the frame, and movable vertically on said guides, means for raising and depressing the cutting mechanism, and driving connections between the motor and the cutter bar, said connections including an automatic clutch the members of which are operatively connected when the cutting mechanism is depressed to its operative position, and disconnected to render the cutter bar inoperative by an upward movement of the cutting mechanism from said position.

10. The combination of a wheeled frame, having substantially vertical guides forward of the wheels, a motor mounted on the frame, a cutting mechanism mounted to reciprocate vertically on said guides, means for reciprocating the cutting mechanism in said guides, driving connections between the motor and the cutting mechanism, said driving connections including a flexible shaft having inner and outer alined members one of which is rotatable independently of the other, a sleeve surrounding and movable endwise on the meeting ends of said members and keyed to the inner member to rotate therewith, clutch members connected with the respective shaft members and operated by said sleeve, and a link connecting said sleeve with a fixed support on the frame and adapted to move the sleeve in one direction to cause clutching engagement of said clutch members when the cutting mechanism is depressed, and to move the sleeve in the opposite direction to separate the clutching members when the cutting mechanism is raised.

11. The combination of a frame comprising a body portion and a forwardly projecting resilient portion, an axle journaled in bearings on the body portion and provided with traction wheels, a motor mounted on the body portion over the axle, a cutting mechanism mounted on the resilient portion, and adapted to maintain the body portion and its load in an upright position and flexible driving connections between the motor and the cutting mechanism.

12. The combination of a frame comprising a body portion and a forwardly projecting resilient portion, an axle journaled in bearings on the body portion and provided with alined traction wheels, a motor mounted on the body portion over the axle, a cutting mechanism mounted on the resilient portion, and adapted to maintain the body portion and its load in an upright position, flexible driving connections between one end of the motor shaft and the cutting mechanism, and variable speed driving connections between the opposite end of the motor shaft and the axle.

In testimony whereof I have affixed my signature, in presence of two witnesses.

ISAAC H. DAVIS.

Witnesses:
P. W. PEZZETTI,
ARTHUR H. BROWN.